United States Patent [19]
Akamatsu

[11] Patent Number: 5,258,938
[45] Date of Patent: Nov. 2, 1993

[54] INTERPOLATING METHOD USING BIT-SHIFT AND ADDITION/SUBTRACTION OPERATIONS

[75] Inventor: Norio Akamatsu, Josanjima Jutaku 2-105, 2-9-2, Nakajosanjima-cho, Tokushima-shi, Tokushima 770, Japan

[73] Assignees: Norio Akamatsu, Tokushima; Alpine Electronics, Inc., Tokyo, both of Japan

[21] Appl. No.: 799,098

[22] Filed: Nov. 27, 1991

[30] Foreign Application Priority Data

Nov. 30, 1990 [JP] Japan .................. 2-336509

[51] Int. Cl.$^5$ .............................................. G06F 7/38
[52] U.S. Cl. ................................................. 364/723
[58] Field of Search ............................. 364/723, 577

[56] References Cited

U.S. PATENT DOCUMENTS

| | | | |
|---|---|---|---|
| 4,313,173 | 1/1982 | Candy et al. | 364/723 |
| 4,460,890 | 7/1984 | Busby | 364/723 X |
| 4,802,109 | 1/1989 | Machida | 364/723 |

*Primary Examiner*—Tan V. Mai

[57] ABSTRACT

In an interpolating method for interpolating interpolated data between discrete items of digital data, there are obtained values of $(2^n-1)$ number of interpolated points which divide, into $2^n$-number of almost equal portions, the interval between two intermediate items of data, which are among four consecutive items of data with the exception of two items of data at both ends thereof. These values are obtained from the four consecutive items of data using a bit-shift operation and an addition/subtraction operation. For example, let $g(x_{i-1})$, $g(x_i)$, $g(x_{i+1})$, $g(x_{i+2})$ represent the data values of four, i.e., first through fourth, consecutive points $x_{i-1}, x_i, x_{i+1}, x_{i+2}$. Three interpolated points are interpolated between the two intermediate points $x_i$, $x_{i+1}$ by computing an interpolated value $f(P_i)$ at a point $P_i$ intermediate the two intermediate points $x_i$, $x_{i+1}$ in accordance with the following equation:

$$f(P_i) = [g(x_{i-1}) + g(x_{i+1}) - g(x_{i+2})]/2^N + [g(x_i) + g(x_{i+1})]/2$$

(where N is a positive integer); obtaining an interpolated value at an intermediate point $Q_i$ of the first point $x_{i-1}$ and second point $x_i$; computing an interpolated value at a point intermediate the second point $x_i$ and the intermediate $P_i$ using data values of the intermediate point $Q_i$, the second point $x_i$, the obtained intermediate point $P_i$ and the third point $x_{i+1}$; obtaining an interpolated value at a point $R_i$ intermediate the third point $x_{i+1}$ and the fourth point $x_{i+2}$; and computing an interpolated value at a point intermediate to the intermediate point $P_i$ and the third point $x_{i+1}$ in accordance with the above-mentioned equation using data values of the second point $x_i$, the obtained intermediate point $P_i$, the third point $x_{i+1}$, and the intermediate point $R_i$.

4 Claims, 7 Drawing Sheets

FIG. 7
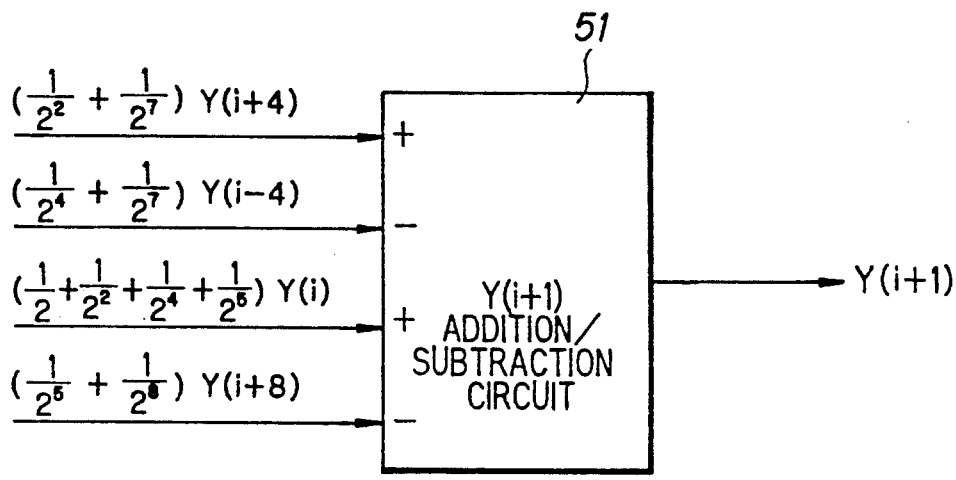
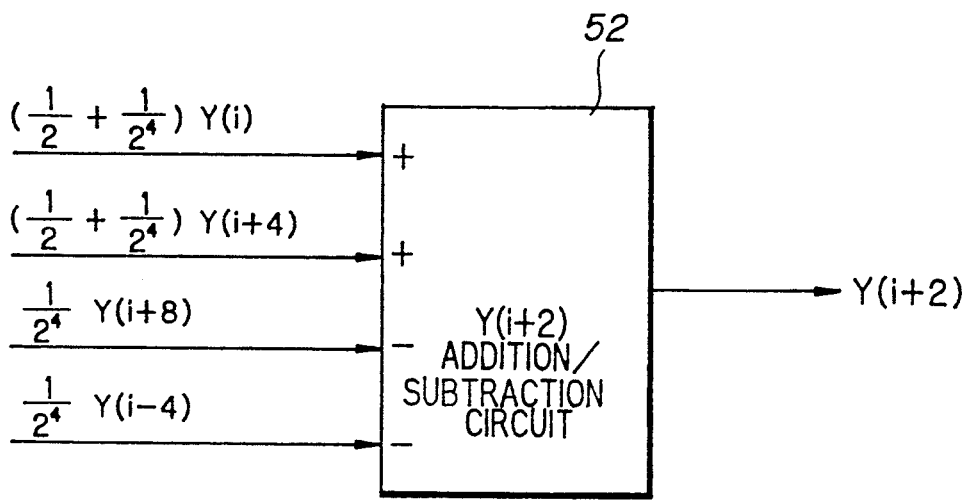
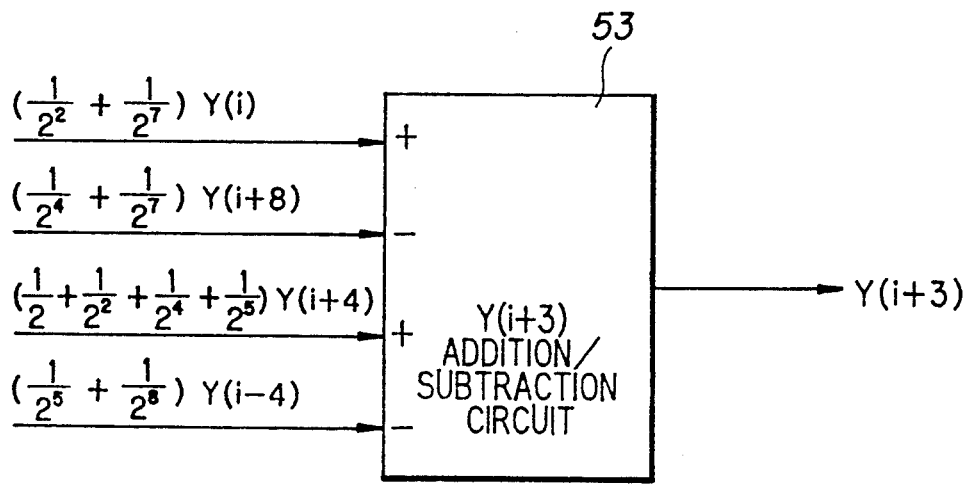

INTERPOLATING METHOD USING BIT-SHIFT AND ADDITION/SUBTRACTION OPERATIONS

BACKGROUND OF THE INVENTION

1. Field of the Invention

This invention relates to a data interpolating method and, more particularly, to an interpolating method which uses four consecutive items of data to interpolate ($2^{n-1}$) number of interpolation points between two items of data intermediate the four items of data.

2. Description of the Related Art

In a compact disk, an analog signal is converted into digital data, and the resulting digital data is recorded on the disk. At playback, predetermined processing is applied to the digital data by a signal processor, the digital data is converted into an analog signal, and the original sound is reproduced from the analog signal. In a compact disk of this kind, there is a limit upon the degree to which the sampling interval of data acquisition can be shortened owing to limitations imposed by the speed of the A/D conversion and the amount of memory capacity. Accordingly, when a waveform which varies at a high speed is played back by being A/D-converted as is at the sampling interval which prevailed at input, a high-quality sound cannot be reproduced if the number of items of data is small. This makes it necessary to obtain a large number of points, in addition to the sampling points, by an interpolating method or the like.

A widely employed indirect interpolating method using a spline function requires a great amount of computation time and therefore is not suited to real-time processing and is inappropriate for processing used to reproduce a musical signal, which demands high speed processing.

In computer graphics, a condition of mathematical continuity is important, and obtaining visually natural pictorial data with regard to discrete pixels is a major problem. Primarily, interpolation does not play a leading role in computer graphics but serves as an aid for displaying images in fine detail. Accordingly, indirect interpolation, in which a prescribed orthogonal function is decided and then interpolated values are found, as in conventional interpolation, can be considered an ideal technique.

When a curve is displayed by indirect interpolation using a polynomial or Fourier series, there are instances where an unnatural curve is displayed owing to an oscillation phenomenon caused by deflection. Further, with indirect interpolation using a spline function, an unnatural overshoot can occur depending upon the data. In order to improve upon this, osculatory interpolation has been proposed by Ackland. However, this method of interpolation involves prolonged computation time, and some oscillation is produced as well. In a technical paper (Journal of the Association for Computing Machinery, Vol.17, No.4, October 1970, pp.589-602), Akima proposes a method of interpolation in which polynomial coefficients are decided locally, thereby making it possible to obtain visually natural results with almost no occurrence of oscillation. However, the Akima method necessitates floating-point arithmetic and therefore requires a long computation time.

In view of the foregoing, there is a need for a highly accurate method of interpolation which allows high-speed processing, and in which oscillation does not occur.

When a curve drawn on an XY plane is represented parametrically, we have $X=F(m)$, $Y=G(m)$. When a curve drawn in XYZ space is represented parametrically, we have $X=F(m)$, $Y=G(m)$, $Z=H(m)$, where m is a parameter. Items of data generated in a computer or items of discrete data such as actually measured values are arranged in a row in regular order to construct a sequence of points $\{x_i, g(x_i)\}$ (i=1, 2, ..., n). When a parametric display method is applied to such a point sequence, an arbitrary point sequence is converted into a set of single-valued point sequences. Therefore, assume that $\{x_i, g(x_i)\}$ is single-valued, without any loss of generality. Accordingly, known data $g(x_i)$ corresponds to each point $x_i$. Let the interval $\Delta_i=[x_i, x_{i+1}]$ (i=1, 2, ..., n-1) be the interpolation interval, and let $P_i$ represent any point in the interpolation interval $\Delta_i$. When $g(x_i)$ (i=1, 2, ..., n) has been given, an interpolated value $f(P_i)$ at the point $P_i$ is obtained. This process is referred to as interpolation or curve creation.

Techniques for determining interpolated values may be classified into direct interpolation and indirect interpolation. In case of direct interpolation, an interpolated value can be computed directly based upon data at a known point in the proximity of the point to be interpolated. Since an interpolated value is determined based upon data in a local area without relation to the global circumstances, it is possible to carry out parallel arithmetic as well.

When indirect interpolation is used, an interpolated value is decided in two steps. First, a polynomial coefficient of a curve passing through a known point is calculated. Next, the coordinates of an interpolated point are substituted into a function that has been decided, and the interpolated value is determined. Since it is difficult to decide a polynomial coefficient locally, this method of interpolation is not suited to parallel arithmetic.

In indirect interpolation, m-number of parameters $\phi_i$ (i=1, 2, ..., n) are determined based upon known data $g(x_i)$ (i=1, 2, ..., n), where $\phi_i$ is the coefficient of each term of an interpolation function. Specifically, it is necessary to solve n-number of equations, namely $$\Phi_1(\phi_1, \phi_2, \ldots \phi_m) = 0$$
$$\Phi_2(\phi_1, \phi_2, \ldots \phi_m) = 0$$
$$\ldots$$
$$\Phi_n(\phi_1, \phi_2, \ldots \phi_m) = 0$$

Methods of indirect interpolation includes Lagrange interpolation, spline interpolation, etc. In Lagrange interpolation, m=n. In spline interpolation using a cubic polynomial, m=n+2. In this case, the number of equations is less than the number of unknowns, and therefore two end conditions such as a natural spline condition are introduced and m-number of parameters $\phi_i$ (i=1, 2, ..., m) are determined. Next, $P_i$ is substituted into a function $\Psi$ decided by $(\phi_1, \phi_2, \ldots \phi_m)$, and the interpolated value of point $P_i$ is found from $$f(P_i)=\Psi(P_i; \phi_1, \phi_2, \ldots \phi_m)$$

When indirect interpolation is applied, an equation containing m-number of unknowns is solved. Therefore, in order to solve this equation, the number of arithmetic operations increases in proportion to $m^2$, a prolonged computation time is required and computation efficiency declines.

Further, in a CAD program or the like, there are also cases where there is a limitation upon the maximum number of data points.

Moreover, since floating-point arithmetic is implemented when solving the equation, problems which arise are the effects of a rounding error as well as the need for a prolonged computation time.

When indirect interpolation is employed, unnatural oscillation is produced and there is a decline in interpolation accuracy. The reason for this is as follows: Since m-number of parameters $\phi_i$ (i=1,2, ..., m) are decided based upon the data of an entire interpolation interval, influence is received from data points sufficiently remote from the interpolated point. Accordingly, if there is an interval in which data undergoes a sudden change, unnatural oscillation is produced. This is referred to as the "Runge phenomenon" in Lagrange interpolation and as the "Gibbs phenomenon" in interpolation using a Fourier series. With spline interpolation, a coefficient of an approximate polynomial is determined every interpolation interval, and hence there tends to be little influence from data points sufficiently remote from the interpolated point. However, in spline interpolation of degree n, continuity up to a derivative of degree (n−1) is introduced. Accordingly, the oscillation phenomenon propagates via the derivative. As a result, if there is an interval in which the derivative becomes large, oscillation occurs in the interpolation intervals before and after this interval and interpolation accuracy declines. This is as pointed out by Akima.

In order to prevent propagation of this oscillatory phenomenon, a rational spline interpolating method and the Akima method of interpolation have been proposed. Akima has proposed a method of determining polynomial coefficients locally. Effective results have been obtained even with regard to data in which oscillation is produced with ordinary spline interpolation. Experimental results show that when an interpolated value is decided using M items of data in the proximity of the interpolated point, rather than using all of the data at one time, interpolation accuracy is improved. It is necessary to experimentally determine the optimum value of the number M of data items for deciding the interpolated value. According to Akima, the gradient of the end points of the interpolation interval is determined by a proportional distribution of the gradient using four points at the periphery thereof, and the interpolated value is found by a cubic polynomial. As a result, the interpolated value is determined locally, propagation of oscillation is suppressed, and an excellent interpolated values are obtained.

However, with the Akima method of interpolation, floating point arithmetic is required and the interpolated value cannot be calculated at high speed.

SUMMARY OF THE INVENTION

An object of the present invention is provide to an interpolating method whereby highly precise interpolated values can be calculated at high speed in highly accurate playback from a compact disk or portrayal of computer graphics or the like.

Another object of the present invention is to provide an interpolating method in which integer-type arithmetic is possible as well as parallel processing.

Still another object of the present invention is provide to an interpolating method based upon direct interpolation in which interpolation accuracy is improved by using only data in the proximity of an interpolated point, as a result of which unnatural oscillation does not occur.

According to the present invention, the foregoing objects are attained by obtaining values of $(2^{n-1})$-number of interpolated points which divide, into $2^n$-number of almost equal portions, the interval between two intermediate items of data, which are among four consecutive items of data with the exception of two items of data at both ends thereof, these values being obtained from the four consecutive items of data using a bit-shift operation and an addition/subtraction operation. More specifically, let $g(x_{i-1})$, $g(x_i)$, $g(x_{i+1})$, $g(x_{i+2})$ represent the data values of four, i.e., first through fourth, consecutive points $x_{i-1}$, $x_i$, $x_{i+1}$, $x_{i+2}$. In accordance with the present invention, three interpolated points are interpolated between the two intermediate points $x_i$, $x_{i+1}$ by a step of computing an interpolated value $f(P_i)$ at a point $P_i$ intermediate the two intermediate points $x_i$, $x_{i+1}$ in accordance with the following equation:

$$f(P_i) = [g(x_i) - g(x_{i-1}) + g(x_{i+1}) - g(x_{i+2})]/2^N + [g(x_i) + g(x_{i+1})]/2$$

(where N is a positive integer); a step of obtaining an interpolated value at an intermediate point $Q_i$ of the first point $x_{i-1}$ and second point $x_i$; a step of computing an interpolated value at a point intermediate the second point $x_i$ and the intermediate $P_i$ using data values of the intermediate point $Q_i$, the second point $x_i$, the obtained intermediate point $P_i$ and the third point $x_{i+1}$; a step of obtaining an interpolated value at a point $R_i$ intermediate the third point $x_{i+1}$ and the fourth point $x_{i+2}$; and a step of computing an interpolated value at a point intermediate the intermediate point $P_i$ and the third point $x_{i+1}$ using data values of the second point $x_i$, the obtained intermediate $P_i$, the third point $x_{i+1}$, and the intermediate point $R_i$.

By performing interpolation processing further using the computed interpolated values of the intermediate points, $(2^{n-1})$-number of interpolated points, which divide the interval between the two intermediate points $x^i$, $x^{i+1}$, into $2^n$-number of equal portions, can be interpolated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3 through 7 are diagrams showing the construction of an embodiment according to the present invention, in which:

FIG. 3 illustrates an arithmetic circuit for computing the coefficient of data Y(i);

FIG. 4 illustrates an arithmetic circuit for computing the coefficient of data Y(i+4);

FIG. 5 illustrates an arithmetic circuit for computing the coefficient of data Y(i−4);

FIG. 6 illustrates an arithmetic circuit for computing the coefficient of data Y(i+8); and FIG. 7 illustrates an adding/subtracting circuit for Y(i+1), Y(i+2), Y(i+3).

DESCRIPTION OF THE PREFERRED EMBODIMENT

Interpolation theory

Figure 1:
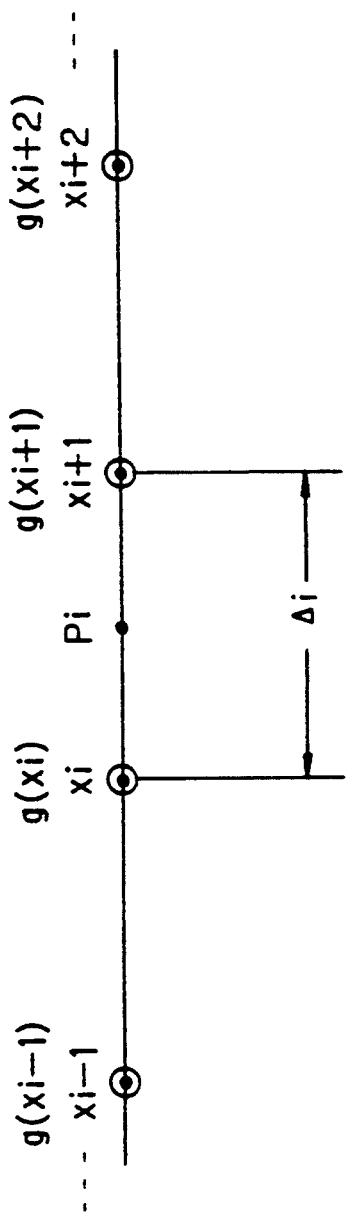
FIG. 1 is a diagram for describing the interpolation theory of the present invention.

The interpolation theory of the present invention will be described in accordance with FIG. 1.

In indirect interpolation, interpolated values cannot be obtained directly; rather, a parameter $\phi_i$ is found by floating point arithmetic in the course or interpolation. For this reason, a disadvantage of indirect interpolation is the long computation time required. With interpolation in accordance with the present invention, an interpolated value $f(P_i)$ is determined directly by the following equation based upon M items of sampling data:

$$f(P_i) = F[g(x_i), \ldots g(x_m)] \quad (1)$$

As a result, computation time can be shortened greatly. Since end points $x_i$, $x_{i+1}$ of an interpolating interval $\Delta_i$ (see FIG. 1) have the greatest effect upon the interpolated value of an interpolate point $P_i$ $g(x_i)$, $g(x_{i+1})$ shall be referred to as main interpolated data, and data $g(x_{i-2})$, $g(x_{i-1})$, $g(x_{i+2})$ . . . at the other points $x_{i-2}$, $x_{i-1}$, $x_{i+2}$ . . . shall be referred to as subordinate interpolated data. If the number M of interpolated items of data is two in the equation above, an interpolated value is decided solely by the main interpolated data, namely the known data $g(x_i)$ and $g(x_{i+1})$ at the end points of the interpolating interval $\Delta_i$ to which the point $P_i$ belongs.

If this method of interpolation is used in playback from a compact disk, there will be cases where the signal varies discontinuously. In order to obtain a reproduced sound which is aurally natural, it is necessary to utilize information indicative of the subordinate interpolated data efficiently and perform highly accurate interpolation. However, computation time is prolonged in proportion to the square of the number of items of known data used in interpolation, and therefore this method is somewhat impractical. Moreover, it is impossible to judge the quality of reproduced sound by aurally introducing information residing in an area sufficiently remote from the point to be interpolated. As a consequence, increasing the number of items of subordinate interpolated data is wasteful, and this approach is not suited to high-speed reproduction.

A leftward corrector $D_L(x_i)$ based upon L items of data $\{g(x_i),(x_{i-1}), \ldots g(x_{i-L+1})\}$ to the left side of point $x_i$ but inclusive of the same is expressed by the following equation:

$$D_L(x_i) = \Gamma_L \{g(x_i), g(x_{i-1}), \ldots g(x_{i-L+1})\} \quad (2)$$

Furthermore, a rightward corrector $D_R(x_{i+1})$ based upon R items of data $\{g(x_{i+1}),(x_{i+2}), \ldots g(x_{i+R})\}$ to the right side of point $x_{i+1}$ but inclusive of the same is expressed by the following equation:

$$D_R(x_{i+1}) = \Gamma_R \{g(x_{i+1}), g(x_{i+2}), \ldots g(x_{i+R})\} \quad (3)$$

As pointed out by Akima, aurally natural data is obtained when an interpolated curve is determined based upon a gradient between data points at the periphery of the interpolating interval of the curve. Here, since high-speed computation of numerical values is the objective, the amount of correction of an interpolated point is made to the weighted sum of the first-order differences of data in the leftward and rightward directions.

In order to obtain interpolated values limiting data to that in a local area of the same degree as that taught by Akima, the left and right correction quantities are obtained in accordance with the following equations:

$$D_L(x_i) = \lambda[g(x_i) - g(x_{i-1})] \quad (4)$$

$$D_R(x_{i+1}) = \lambda[g(x_{i+1}) - g(x_{i+2})] \quad (5)$$

where the Optimum value of $\lambda(\lambda 1)$ is determined experimentally. When a power of 2 is adopted in a digital computer, integer-type division is performed merely by shifting bits, and therefore the time required for numerical computation is shortened. Accordingly, $$\lambda = \tfrac{1}{2}^N = 1/\Lambda \quad (6)$$

is adopted to decide the N for which the interpolation error will be minimized. Putting the foregoing facts together, we can obtain the interpolated value at the intermediate point $P_i$ of the interpolating interval, namely an interpolated value for which the number of interpolating steps is one, in accordance with $$f(P_i) = [g(x_i) - g(x_{i-1}) + g(x_{i+1}) - g(x_{i+2})]/2^N + [g(x_i) + g(x_{i+1})]/2 \quad (7)$$

(where N is a positive integer).

In indirect interpolation, an intermediate parameter $\phi_i$ is calculated by floating point arithmetic based upon known data of a fixed point, and then interpolated data of the fixed point is generated. Since the amount of change in $\phi_i$ is very large, there are cases where a sufficient accuracy is not obtained and reproduced sounds become unnatural if all of the foregoing is processed by fixed decimal points. However, in the method of interpolation according to the present invention, integer-type interpolated data can be generated from integer-type known data even if floating-point arithmetic is not used. As a result, reproduced sounds which are aurally natural can be obtained. Accordingly, when this method of interpolation is put into the form of hardware, it is highly advantageous for use in reproduction from a compact disk by virtue of its high speed.

Interpolation operation in case of two-step interpolation

Figure 2:
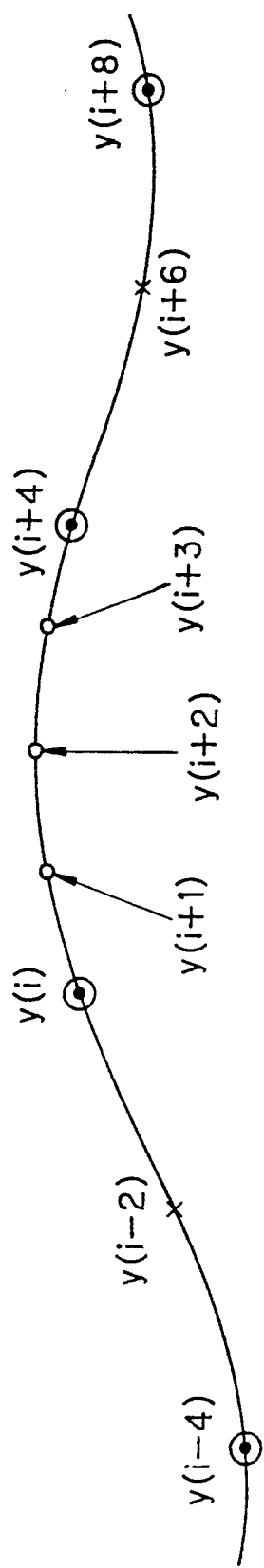
FIG. 2 is a diagram for describing a two-step interpolation computation method according to the present invention.

FIG. 2 is a diagram for describing the interpolating method of the invention in a case where interpolation is performed in two steps. In the sequence of points shown in FIG. 2, assume that items of data Y(i−4), Y(i), Y(i+4), Y(i+8) are given at points y(i−4), y(i), y(i+4), y(i+8), respectively. The interpolated values of intermediate points are obtained by applying the interpolating method of the present invention.

The interpolated value Y(i+2) of a point y(i+2) intermediate to the known data points y(i) and y(i+4) shown in FIG. 2 is given by the following equation on the basis of Eq. (7), where it is assumed that N in Eq. (7) is equal to 4:

$$\begin{aligned} Y(i+2) = & +\{1/2^1 + 1/2^4\} \cdot Y(i) \\ & +\{1/2^1 + 1/2^4\} \cdot Y(i+4) \\ & -\{1/2^4\} \cdot Y(i+8) \\ & -\{1/2^4\} \cdot Y(i-4) \end{aligned} \quad (8)$$

The first step of interpolation is carried out in accordance with Eq. (8).

Furthermore, when the method of the present invention is applied to the data points y(i−2), y(i), y(i+2), y(i+4), the interpolated value Y(i+1) of the point y(i+1) intermediate to the points y(i) and y(i+2) can be obtained in accordance with the following equation:

$$
\begin{aligned}
Y(i+1) = & +\{1/2^1 + 1/2^4\} \cdot Y(i) \\
& +\{1/2^1 + 1/2^4\} \cdot Y(i+2) \\
& -\{1/2^4\} \cdot Y(i+4) \\
& -\{1/2^4\} \cdot Y(i-2)
\end{aligned}
\quad (9a)
$$

where Y(i−2) can be obtained in accordance with the following equation using the data Y(i−8), Y(i−4), Y(i), Y(i+4) of the known data y(i−8), y(i−4), y(i), y(i+4):

$$
\begin{aligned}
Y(i-2) = & +\{1/2^1 + 1/2^4\} \cdot Y(i-4) \\
& +\{1/2^1 + 1/2^4\} \cdot Y(i) \\
& -\{1/2^4\} \cdot Y(i+4) \\
& -\{1/2^4\} \cdot Y(i-8)
\end{aligned}
\quad (9b)
$$

When Eq. (8) and eq. (9) are substituted into Eq. (9a), we have $$
\begin{aligned}
Y(i+1) = & +\{1/2^1 + 1/2^7\} \cdot Y(i+4) \\
& -\{1/2^4 + 1/2^7\} \cdot Y(i-4) \\
& +\{1/2^1 + 1/2^2 + 1/2^4 + 1/2^5\} \cdot Y(i) \\
& -\{1/2^5 + 1/2^8\} \cdot Y(i+8) \\
& -\{1/2^8\} \cdot Y(i-8)
\end{aligned}
\quad (9c)
$$

If the coefficient $\frac{1}{2^8}$ of Y(i−8) in Eq. 9(c) is neglected because it is smaller than the other coefficients, then Y(i+1) will be given by the following equation:

$$
\begin{aligned}
Y(i+1) = & +\{1/2^1 + 1/2^7\} \cdot Y(i+4) \\
& -\{1/2^4 + 1/2^7\} \cdot Y(i-4) \\
& +\{1/2^1 + 1/2^2 + 1/2^4 + 1/2^5\} \cdot Y(i) \\
& -\{1/2^5 + 1/2^8\} \cdot Y(i+8)
\end{aligned}
\quad (9)
$$

Furthermore, when the present invention is applied to the known data points y(i), y(i+2), y(i+4), y(i+6), the interpolated value Y(i+3) of y(i+3), which is a point intermediate to the points y(i+2) and y(i+4), can be obtained in accordance with the following equation:

$$
\begin{aligned}
Y(i+3) = & +\{1/2^1 + 1/2^4\} \cdot Y(i+2) \\
& +\{1/2^1 + 1/2^4\} \cdot Y(i+4) \\
& -\{1/2^4\} \cdot Y(i+6) \\
& -\{1/2^4\} \cdot Y(i)
\end{aligned}
\quad (10a)
$$

where Y(i+6) can be obtained in accordance with the following equation using the data Y(i), Y(i+4), Y(i+8), Y(i+12) of the known data points y(i), y(i+4), y(i+8), y(i+12):

$$
\begin{aligned}
Y(i+6) = & +\{1/2^1 + 1/2^4\} \cdot Y(i+4) \\
& +\{1/2^1 + 1/2^4\} \cdot Y(i+8) \\
& -\{1/2^4\} \cdot Y(i+12) \\
& -\{1/2^4\} \cdot Y(i)
\end{aligned}
\quad (10b)
$$

When Eq. (8) and Eq. (10b) are substituted into Eq. (10a), we have $$
\begin{aligned}
Y(i+3) = & +\{1/2^2 + 1/2^7\} \cdot Y(i) \\
& -\{1/2^4 + 1/2^7\} \cdot Y(i+8) \\
& +\{1/2^1 + 1/2^2 + 1/2^4 + 1/2^5\} \cdot Y(i+4) \\
& -\{1/2^5 + 1/2^8\} \cdot Y(i-4) \\
& -\{1/2^8\} \cdot Y(i+12)
\end{aligned}
\quad (10c)
$$

If the coefficient $\frac{1}{2^8}$ of Y(i+12) in Eq. 10(c) is neglected because it is smaller than the other coefficients, then Y(i+3) will be given by the following equation:

$$
\begin{aligned}
Y(i+3) = & +\{1/2^1 + 1/2^7\} \cdot Y(i) \\
& -\{1/2^4 + 1/2^7\} \cdot Y(i+8) \\
& +\{1/2^1 + 1/2^2 + 1/2^4 + 1/2^5\} \cdot Y(i+4) \\
& -\{1/2^5 + 1/2^8\} \cdot Y(i-4)
\end{aligned}
\quad (10)
$$

The second step of interpolation is carried out in accordance with Eqs. (9) and (10).

These computation equations (8) through (10) include the operations of addition, subtraction and division by powers of 2. Among these operations, addition and subtraction are integer-type arithmetic operations and therefore can be performed at high speed. Furthermore, since division by a power of 2 is performed by shifting bits to the right, this is achieved by the wiring in hardware. Accordingly, it is easy to realize the computation equations in the form of hardware. If the number of interpolation steps is made large, highly precise interpolated points are connected and obtained at high speed.

Diagrams illustrating construction of embodiment of the invention

FIGS. 3 through 7 are diagrams illustrating the construction of an embodiment of the invention for a case where the number of interpolation steps is two. These illustrate examples for a case where three interpolated points y(i+1), y(i+2), y(i+3) are interpolated between two intermediate points y(i), y(i+4) using the data Y(i−4), Y(i), Y(i+4), Y(i+8) of the four known data points y(i−4), y(i), y(i+4), y(i+8) shown in FIG. 2.

Figure 3:
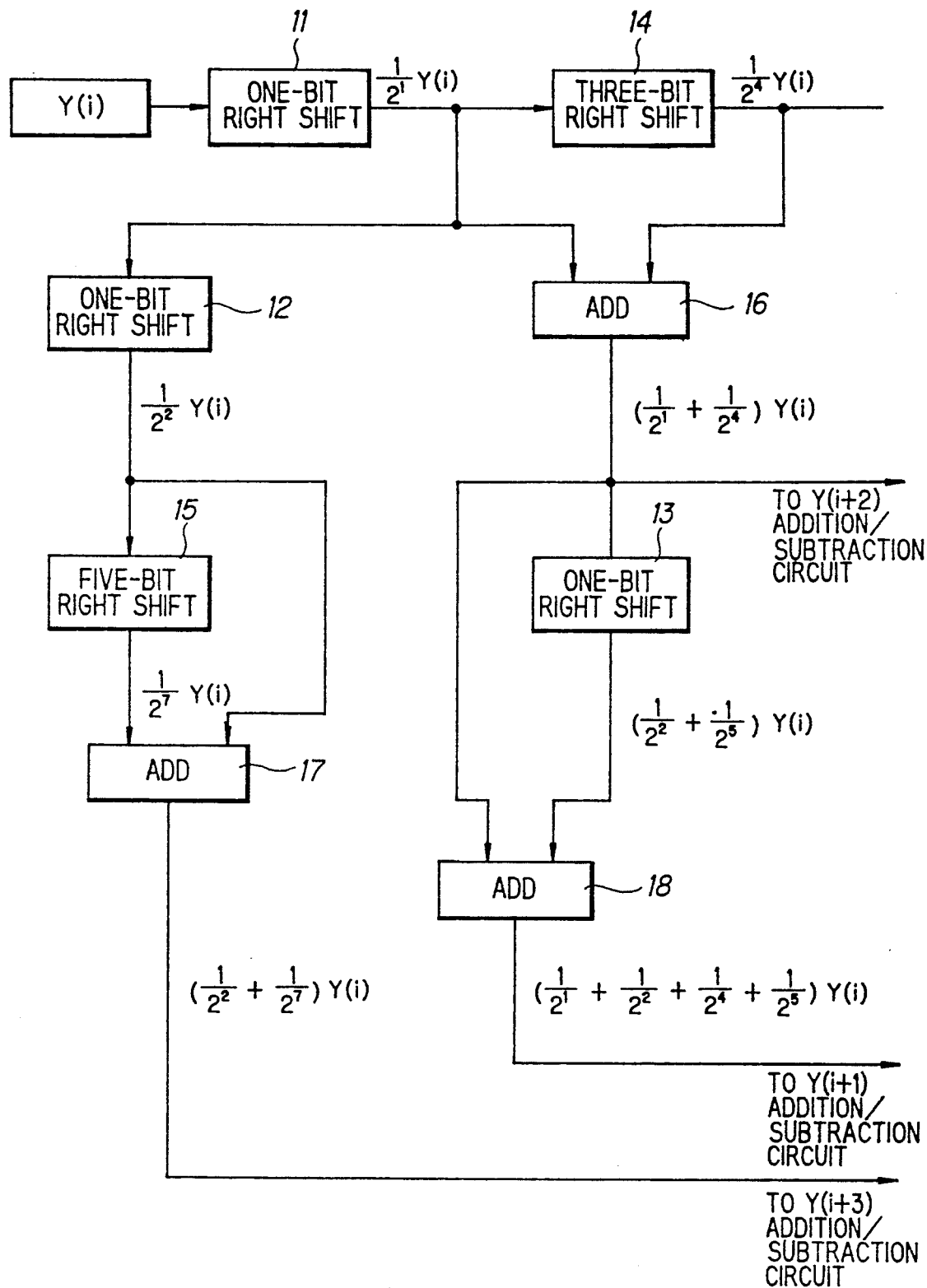

FIG. 3 shows an arithmetic circuit for computing a portion relating to the data Y(i) in Eqs. (8)−(10). The arithmetic circuit comprises one-bit, right-shift circuits 11-13, a three bit, right-shift circuit 14, a five-bit, right-shift circuit 15, and adder circuits 16-18. This arithmetic circuit computes the following:

the first term on the right side of Eq. (8), namely $$\{\tfrac{1}{2}^1 + \tfrac{1}{2}^4\} \cdot Y(i);$$

the third term on the right side of Eq. (9), namely $\{\tfrac{1}{2}^1+\tfrac{1}{2}^2+\tfrac{1}{2}^4+\tfrac{1}{2}^5\}\cdot Y(i)$; and the first term on the right side of Eq. (10), namely $\{\tfrac{1}{2}^2+\tfrac{1}{2}^7\}\cdot Y(i)$.

Figure 4:
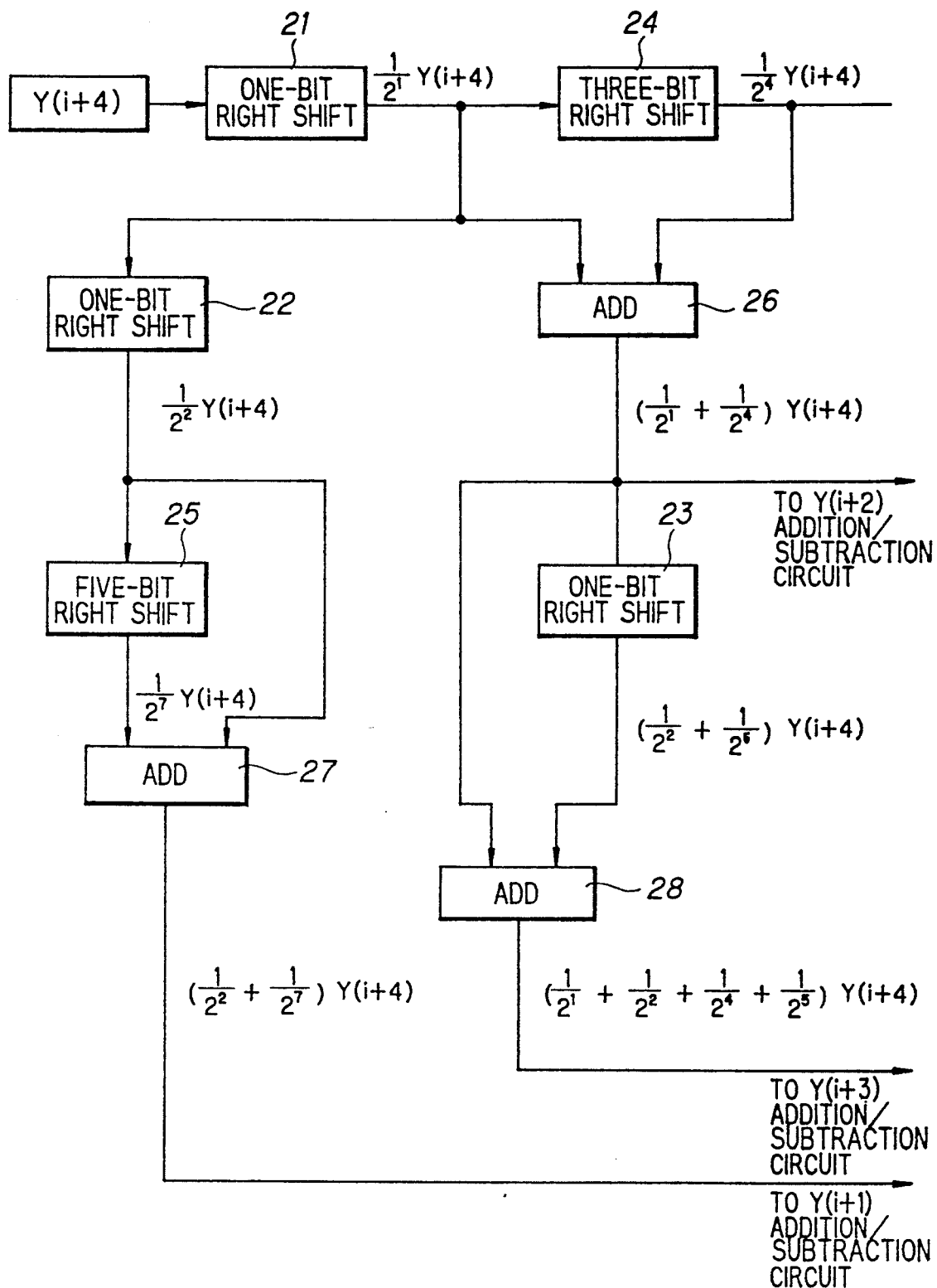

FIG. 4 shows an arithmetic circuit for computing a portion relating to the data Y(i+4) in Eqs. (8)–(10). The arithmetic circuit comprises one-bit, right-shift circuits 21–23, a three-bit, right-shift circuit 24, a five-bit, right-shift circuit 25, and adder circuits 26 28. This arithmetic circuit computes the following:

the second term on the right side of Eq. (8), namely $\{\tfrac{1}{2}^1+\tfrac{1}{2}^4\}\cdot Y(i+4)$;

the first term on the right side of Eq. (9), namely $\{\tfrac{1}{2}^2+\tfrac{1}{2}^7\}\cdot Y(i+4)$; and the third term on the right side of Eq. (10), namely $\{\tfrac{1}{2}^1+\tfrac{1}{2}^2+\tfrac{1}{2}^4+\tfrac{1}{2}^5\}\cdot Y(i+4)$.

Figure 5:
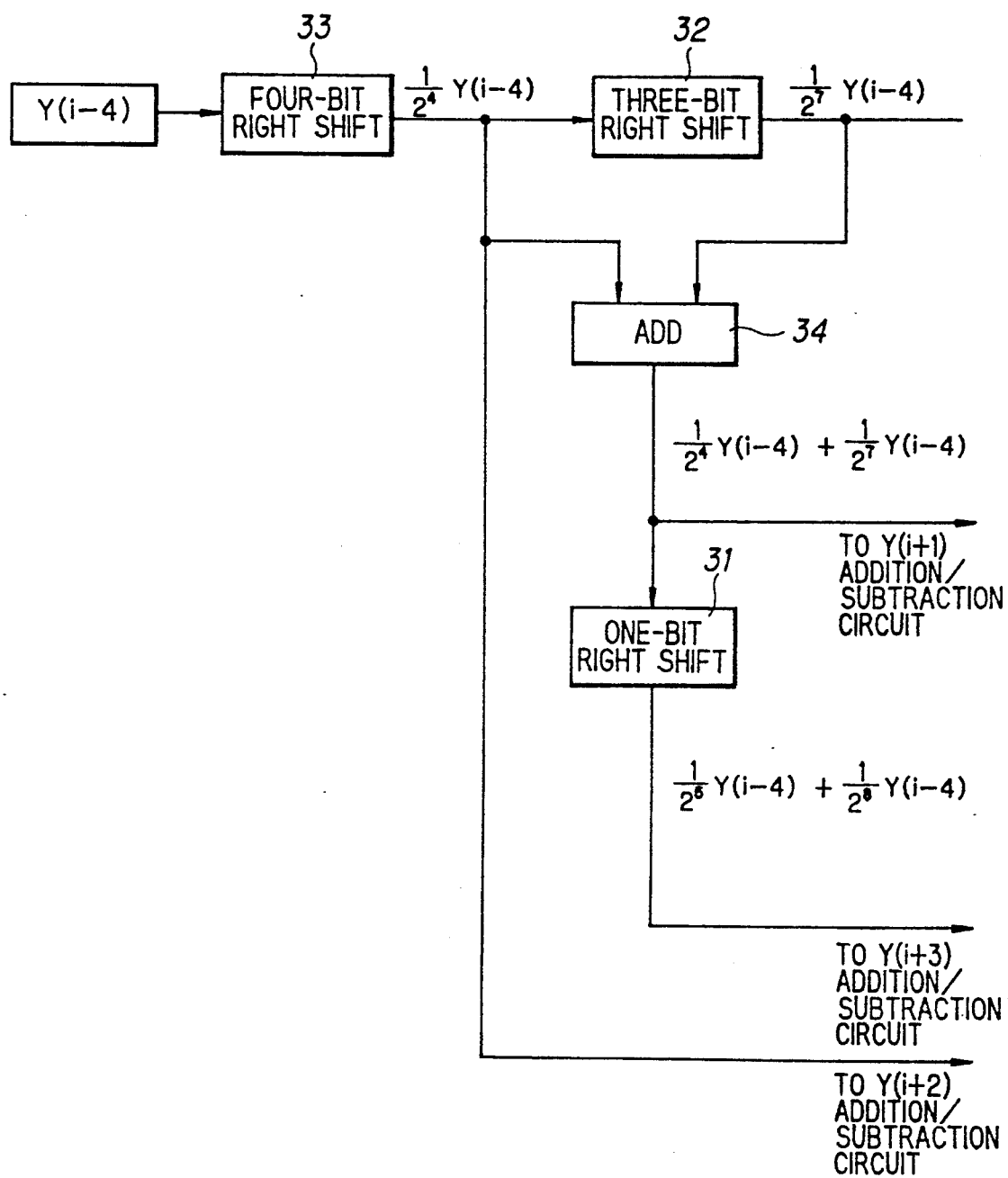

FIG. 5 shows an arithmetic circuit for computing a portion relating to the data Y(i−4) in Eqs. (8)–(10). The arithmetic circuit comprises a one-bit, right-shift circuit 31, a three-bit, right-shift circuit 32, a four-bit, right shift circuit 33, and an adder circuit 34. This arithmetic circuit computes the following:

the fourth term on the right side of Eq. (8), namely $\{\tfrac{1}{2}^4\}\cdot Y(i-4)$;

the second term on the right side of Eq. (9), namely $\{\tfrac{1}{2}^4+\tfrac{1}{2}^7\}\cdot Y(i-4)$; and the fourth term on the right side of Eq. (10), namely $\{\tfrac{1}{2}^5+\tfrac{1}{2}^8\}\cdot Y(i-4)$.

Figure 6:
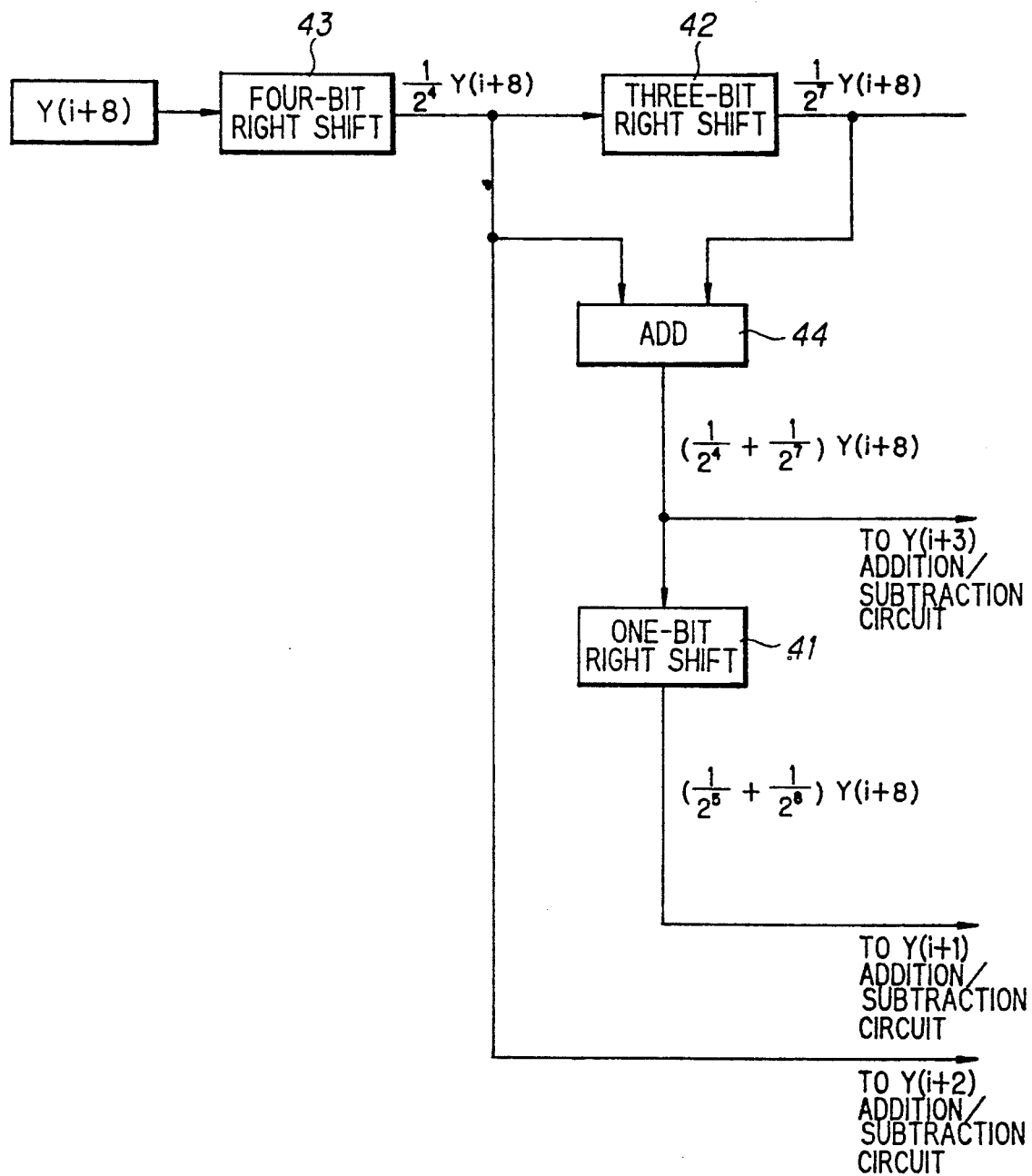

FIG. 6 shows an arithmetic circuit for computing a portion relating to the data Y(i+8) in Eqs. (8)–(10). The arithmetic circuit comprises a one-bit, right-shift circuit 41, a three-bit, right-shift circuit 42, a four-bit, right-shift circuit 43, and an adder circuit 44. This arithmetic circuit computes the following:

the third term on the right side of Eq. (8), namely $\{\tfrac{1}{2}^4\}\cdot Y(i+8)$;

the fourth term on the right side of Eq. (9), namely $\{\tfrac{1}{2}^5+\tfrac{1}{2}^8\}\cdot Y(i+8)$; and the second term on the right side of Eq. (10), namely $\{\tfrac{1}{2}^4+\tfrac{1}{2}^7\}\cdot Y(i+8)$.

In FIG. 7, numerals 51, 52, 53 respectively denote a Y(i+1) adding/subtracting circuit, a Y(i+2) adding/subtracting circuit and a Y(i+3) adding/subtracting circuit for computing interpolated data Y(i+1), Y(i+2) and Y(i+3), respectively. Using the results of computations performed by the arithmetic circuits of FIGS. 3 through 6, these circuits compute the interpolated values of the interpolated data Y(i+1), Y(i+2) and Y(i+3) at the three interpolated points y(i+1), y(i+2) and y(i+3) by performing the addition/subtraction operations of Eqs. (8), (9) and (10).

A simplification may be achieved in which portions that become the same algorithm are changed over by a switch. As a result, interpolated values of the three points {y(i+1), y(i+2) and y(i+3)} are obtained by introducing the data of the four points {y(i−4), y(i), y(i+4), y(i+8)}, and therefore efficiency is excellent.

Interpolation operation in case of n-step interpolation

The foregoing is for a case where the interpolation steps are two in number. However, interpolation of any number of steps can be carried out by successively repeating the computations of Eqs. (8), (9) and (10) using the interpolated values obtained by the interpolation operation. In general, by carrying out n-step interpolation, it is possible to interpolate, by computation, interpolated data at $(2^{n-1})$-number of interpolated points which divide, into $2^n$-number of approximately equal portions, the interval between two intermediate items of data with the exception of the two items of data at the ends of four items of consecutive data.

Evaluation of the interpolating method of the invention

Since the true value of an interpolated value generated based upon data sampled or calculated in a certain sampling interval is unknown, it is difficult to evaluate the accuracy of the method of interpolation. For example, when the Akima data is interpolated by a cubic spline function, the Runge phenomenon occurs, the curve overshoots and develops oscillation. As a result, highly accurate interpolated data cannot be obtained and it is difficult to output highly precise reproduced sound and to display a highly accurate image. The curve also varies suddenly in CAD/CAM applications, and there are cases also in which a highly precise display cannot be presented unless interpolation is performed using a spline function of higher order. Though introducing the continuity of a derivative of higher order to an interpolated curve is easy mathematically, computation time is prolonged greatly.

The purpose of the interpolating method is to obtain smooth, natural data. In order to arrange it so that visual unnaturalness will not appear in a case where a sequence of points obtained by interpolation is displayed, it is necessary to make a comparison with a smooth curve. Interpolated points are obtained using a higher order curve having continuity, and the accuracy of interpolation is evaluated by the difference between the point sequence of the interpolated points and a point sequence obtained by the interpolating method of the present invention.

In computer graphics, pictorial data (data specifying color) that has been stored in an image memory which corresponds to a pixel is read out sequentially and displayed. The content of an ordinary image memory integer-type data is of eight to 32 bits. A method of presenting a pictorial display in computer graphics entails deciding integer-type pictorial data corresponding to a fine grid based upon integer-type known pictorial data corresponding to a grid having a large spacing. Accordingly, if all computations are performed in the form of integers in the process for generating pictorial data, computation time can be greatly curtailed. It is better not to use floating-point arithmetic.

As will be evident from the algorithm of the interpolating method according to this invention, this method of interpolation is such that many interpolated points are obtained by addition, subtraction and bit shifts. Accordingly, it is possible to obtain interpolated values at high speed by such operations. Further, since interpolated values are found by using local data, the method is suited to parallel processing and a further increase in speed is possible. In particular, the interpolating method according to the invention is suited to a graphic processor or the like which applies parallel processing to an operation while a block transfer is performed from a memory corresponding to a pixel.

In interpolation using a spline function, equations equal in number to the items of data provided in order to decide the coefficients must be solved. The amount of computation increases in proportion to the square of the data, and the number of multiplications which require a large amount of computation time increases. Accordingly, when there is a large number of items of data, computation time becomes very long. Hence, this method of interpolation is not suited to high-speed interpolation.

Since the interpolating method of the invention determines the values of interpolated points locally, there is no sudden increase in computation time even if the number of data items is large.

Actual computation time will be illustrated below. Approximately 6.5 msec is required in order to obtain the interpolated value of one point by applying the cubic spline interpolating method, which heretofore has been the method mainly employed, using C language. However, when the interpolating method of this invention is applied using 16-bit integer-type arithmetic, about 0.2 msec suffices, and a speed-up of more than 300 times is possible. This large-scale difference in computation time is due to the fact that interpolation by a spline function uses floating-point arithmetic, while the interpolating method of this invention employs integer-type arithmetic. Moreover, since direct interpolation is an algorithm suited to parallel arithmetic, it is possible to shorten computation time further by utilizing this parallel property. Executing the computation of an interpolating method, which employs a spline function, by using special-purpose hardware is too difficult and lacks practical value. However, since the algorithm of the interpolating method of this invention is implemented by addition/subtraction and shift operations, the special-purpose hardware also is simple to construct. In conclusion, an interpolating method of much greater speed can be developed by undertaking the construction of hardware utilizing the parallel property.

When known data is given at equal intervals, the algorithm of the interpolation method of this invention is simplified and sufficient accuracy is obtained if all computations are carried out by integer-type arithmetic.

As the result of studies performed applying the invention to various graphic data, it has been found that there is almost no change in interpolation precision, even if integer-type arithmetic is applied, so long as the data points are at approximately equal intervals, i.e., so long as the data is quasi-periodic data. Thus, the data points need not be at exactly equal intervals.

Comparison of the cubic spline method and the method of this invention

A specific cubic spline method and the interpolating method of this invention will now be compared.

When an interpolated curve is formed by the cubic spline method, the continuity of a derivative up to the second degree is satisfied periodically.. However, the continuity of a derivative and the quality of a displayed picture do not perfectly coincide. In order to display a visually natural and smooth image, it is necessary to give consideration to a continuous change between pixels. In a case where a curved surface having a large rate of change is actually displayed using a cubic spline function, there is the possibility that an oscillatory image will be produced so that there is a disturbance in the global mode of the image.

Since only interpolated points corresponding to pixels of an image are computed, this is ideal for a high-speed image display. In computer graphics, an image memory is in 1:1 correspondence with the pixels. Accordingly, directly generating pictorial data is a necessary and sufficient condition. From this point of view, spline interpolation is an indirect method. More specifically, the coefficients of a spline function are obtained based upon continuity of higher degree at a nodal point, and position information indicative of the position of a pixel is introduced to the function decided, thereby generating pictorial data of the pixel. When spline coefficients are actually obtained, pictorial data for an infinitely small pixel can be generated. Since it is sufficient merely to generate pictorial data of discretely arrayed pixels, this corresponds to obtaining more than the necessary amount of information through a calculation process that is more than sufficient. By obtaining only data of an interpolated point corresponding to each pixel and simplifying the computation process, an image display of a high speed graphic is realized. Furthermore, in order to mathematically satisfy continuity of higher degree, floating point arithmetic is unavoidable.

Though it is possible to implement floating-point arithmetic by a co processor, this would require much more computation time than in the case of fixed-point arithmetic. Moreover, unless bits are made sufficiently long, highly precise interpolated results will not be obtained because of cancellation.

Since true values corresponding to interpolated values are unknown, it is difficult to evaluate the accuracy of interpolated points.

Accordingly, the values of points between grid points are obtained by interpolation, with a point sequence $\{X_n\}$ on a one-dimensional grid calculated by a curve described by a known function being the given data, and accuracy is evaluated by making a comparison with the values decided based upon the original function values.

In a case where a known function is of lower degree and, moreover, the spacing between data points is small, results of considerably high accuracy are obtained by linear interpolation. Accordingly, in order to evaluate the accuracy of interpolation, it is necessary to use a function of a comparatively high degree as the known function. Furthermore, based upon the results of numerical experiments, it has been found that an interpolating method in which a function of higher degree can be accurately displayed provides a display more accurate than in the case of a function of lower degree. Visual considerations are of the upmost importance. Since there are no conditions for visually discriminating between a condition decided from the left direction and a condition decided from the right direction, both are incorporated on an equal footing. Consequently, points decided by the conditions from both the right and left directions are added and averaged, thereby obtaining interpolated values.

In accordance with the interpolating method of the present invention, interpolated values can be obtained by integer-type arithmetic consisting merely of addition, subtraction and bit shifting operations. Moreover, parallel processing is possible. As a result, interpolated values can be obtained at high speed. For example, it is possible to perform processing at a speed several hundred times higher than with interpolation using floating point arithmetic. Processing at a speed more than a thousand times higher also may be made possible by adopting a hardware arrangement as well as parallel processing.

Further, in accordance with the invention, there can be provided a new interpolating method free of the drawbacks of the conventional spline interpolating method, namely low speed and a decline in interpolating accuracy that is caused by the oscillatory phenomenon. In particular, it is possible to obtain an interpolate curve, which is based upon local data, in such a manner that oscillation will not occur, even with regard to data which varies in a sudden manner.

When the foregoing features are exploited and applied to the following fields, interpolation processing at a speed and accuracy not obtainable with the conventional methods is possible:

(1) Utilization for obtaining interpolated values of a compact disk

If the interpolating method of the invention is implemented by hardware such as integrated circuitry and an apparatus which performs playback using this hardware is constructed, video-signal sampling points and many interpolated values between these sampling points can be obtained at high speed and accuracy. As a result, high-quality sound can be reproduced in a very short period of time.

(2) Application to computer graphics

The interpolating method of the present invention can be applied to a case where an image is processing at high speed and displayed, e.g., a case where an image is displayed upon being enlarged. More specifically, in a situation where an image is enlarged four times so that a very fine portion thereof may be observed, the interpolating method of the present invention is applied twice (two-step interpolation) to obtain intermediate points as well as points intermediate these intermediate points, thereby making it possible to display a highly accurate image at high speed.

In a case where the distribution of an electro-encephalogram or electrocardiogram is displayed as a medical image in the form of equipotential lines, these images change in a dynamic manner. This means that a high speed image processing technique is required. The present invention is ideal for satisfying this requirement.

In the field of industrial measurement, a real-time display of a temperature or pressure distribution, etc., is required. The method of the invention is applicable to such a real-time display.

(3) Application to CAD/CAM

If a portion of an image is displayed upon being enlarged, a highly accurate image can be displayed. When an image is simply enlarged, the pixels become too spaced apart and image quality deteriorates. When the interpolating method of the present invention is applied in order to prevent this deterioration, highly accurate enlarged figures can be displayed at high speed.

In case of a complex shape, the coordinates (X,Y,Z) of a number of points are measured using a digitizer or a three-dimensional measuring device, and these points are smoothly connected using the interpolating method of the present invention, thereby making it possible to express the shape faithfully. Furthermore, a free curved surface can be constructed by giving a plurality of points to create a wire-frame model and applying the interpolating method of the invention to this model. This makes it possible to generate machining data for injection molding.

(4) Application to numerical control

The interpolating method of the present invention can be applied when creating an NC tape for machining a workpiece by interpolating several interpolated points between known points and moving a tool along a curve which connects these known points and interpolated points.

(5) Application to compression of data indicative of images and the like

Pictorial data can be reproduced at high speed by compressing pictorial data indicative of images and the like, transmitting or storing the data, and then applying the interpolating method of the present invention.

As many apparently widely different embodiments of the present invention can be made without departing from the spirit and scope thereof, it is to be understood that the invention is not limited to the specific embodiments thereof except as defined in the appended claims.

What is claimed is:

1. An interpolating method for interpolating interpolated data between discrete items of digital data, comprising the steps of:

(a) inputting $g(x_{i-1})$, $g(x_i)$, $g(x_{i+1})$, $g(x_{i+2})$ which represent values of the digital data of first through fourth consecutive pints $x_{i-1}$, $x_i$, $x_{i+1}$, $x_{i+2}$, respectively;

(b) computing a value $f(P_i)$ of the interpolated data at a point $P_i$ intermediate to the second and third consecutive points $x_i$, $x_{i+1}$ by a bit-shift operation performed by a bit shift circuit and an addition/subtraction operation performed by an addition/subtraction circuit in accordance with an equation:

$$f(P_i) = (g(x_i) - g(x_{i-1}) + g(x_{i+1}) - g(x_{i+2}))/2^N + (g(x_i) + g(x_{i+1}))/2$$

where N is a positive integer; and (c) interpolating the value $f(P_i)$ at the point $P_i$.

2. The method according to claim 1, further comprising the steps of:

(d) obtaining a second value of the interpolated data at a second point $Q_i$ intermediate to the first consecutive point $x_{i-1}$ and the second consecutive point $x_i$;

(e) computing a third value of the interpolated data at a third point intermediate tot he second consecutive point $x_i$ and the point $P_i$ in accordance with said equation using data values of the second point $Q_i$, the second consecutive point $x_i$ and the point $P_i$ and the third consecutive point $x_{i+1}$;

(f) obtaining a fourth value of the interpolated data at a fourth point $R_i$ intermediate to the third consecutive point $x_{i+1}$ and the fourth consecutive point $x_{i+2}$; and (g) computing a fifth value of the interpolated data at a fifth point intermediate to the point $P_i$ and the third consecutive point $x_{i+1}$ in accordance with said equation using the data values of the second consecutive point $x_i$, the point $P_i$, the third consecutive point $x_{i+1}$ and the fourth point $R_i$.

3. The method according to claim 2, further comprising the steps of:
   (h) performing interpolation processing further using the value and the second, third, fourth and fifth values of each of the -point and the second, third fourth and fifth points; and
   (i) computing values of $(2^n-1)$-number of interpolated points which divide an interval between the second and third points into $2^n$-number of equal portions.

4. An interpolating method for interpolating interpolated data between discrete items of digital data, comprising the steps of:
   (a) inputting Y(i−4), Y(i), Y(i+4), Y(i+8) which respectively represent first, second, third and fourth consecutive times of data y(i−4), Y(i), Y(i+4), Y(i+8);
   (b) computing a first value Y(i+2) of the interpolated data of a first point y(i+2) intermediate to the second and third consecutive items of data y(i) and y(i+4) using a first bit-shift operation performed by a first bit shift circuit and a first addition/subtraction operation performed by a first addition/substraction circuit in accordance with a first equation:

$$\begin{aligned} Y(i+2) = &+\{1/2^1 + 1/2^4\} \cdot Y(i) \\ &+\{1/2^1 + 1/2^4\} \cdot Y(i+4) \\ &-\{1/2^4\} \cdot Y(i+8) \\ &-\{1/2^4\} \cdot Y(i-4); \end{aligned}$$

(c) computing a second value Y(i+1) of the interpolated data of a second point y(i+1) intermediate to the second consecutive item of data y(i) and the first point y(i+2), using a second bit-shift operation performed by a second bit shift circuit and a second addition/subtraction operation performed by a second addition/subtraction circuit in accordance with a second equation:

$$\begin{aligned} Y(i+1) = &+\{1/2^1 + 1/2^7\} \cdot Y(i+4) \\ &-\{1/2^4 + 1/2^7\} \cdot Y(i-4) \\ &+\{1/2^1 + 1/2^2 + 1/2^4 + 1/2^5\} \cdot Y(i) \\ &-\{1/2^5 + 1/2^8\} \cdot Y(i+8); \end{aligned}$$

(d) computing a third value Y(i+3) of the interpolated data of a third point y(i+3) intermediate to the first point y(i+2) and the third consecutive item of data y(i+4), using a third bit-shift operation performed by a third bit shift circuit and a third addition/subtraction operation performed by a third addition/subtraction circuit in accordance with a third equation:

$$\begin{aligned} Y(i+3) = &+\{1/2^2 + 1/2^7\} \cdot Y(i) \\ &-\{1/2^4 + 1/2^7\} \cdot Y(i+8) \\ &+\{1/2^1 + 1/2^2 + 1/2^4 + 1/2^5\} \cdot Y(i+4) \\ &-\{1/2^5 + 1/2^8\} \cdot Y(i-4); \text{ and} \end{aligned}$$

(e) interpolating the first, second and third values of the interpolated data of the firs, second and third points between the second and third consecutive items of data.

* * * * *